Aug. 18, 1964   E. G. BLOHM ETAL   3,145,317
HARNESS CONNECTION FOR DYNAMOELECTRIC MACHINES
Filed Oct. 21, 1960   2 Sheets-Sheet 1

INVENTORS
EDWARD G. BLOHM
EUGENE F. McHALE
WILLIAM L. UNRIGHT

THEIR ATTORNEY  *James R. Campbell*

INVENTORS
EDWARD G. BLOHN
EUGENE F. McHALE
WILLIAM L. UNRIGHT

THEIR ATTORNEY

United States Patent Office 3,145,317
Patented Aug. 18, 1964

3,145,317
HARNESS CONNECTION FOR DYNAMOELECTRIC MACHINES
Edward G. Blohm, Scotia, Eugene F. McHale, Schenectady, and William L. Unright, Altamont, N.Y., assignors to General Electric Company, a corporation of New York
Filed Oct. 21, 1960, Ser. No. 92,727
7 Claims. (Cl. 310—260)

The invention described herein relates to dynamoelectric machines and more particularly to a pre-formed harness assembly used for simplifying the process of making power lead and other connections in and to the winding in a motor or generator.

As is customary in the art, after coils comprising the winding have been installed in a magnetic core for a motor or generator, certain of the coils are connected to each other and in groups or phases in a predetermined manner to provide a desired mode of operation for the machine. In making these connections, an operator is supplied an electrical connection diagram which shows the connection arrangement for the particular machine being worked on. Usually, no standard or set form of procedure is required to be followed in making the various lead, jumper, equalizer, and other connections in the machine. The operator, therefore, is given discretion in installing the various conductor leads and it is not unusual to find that machines of the same type and rating often will look dissimilar because of the different procedures followed by operators in physically positioning the conductor leads around the end turns. In many cases electrically identical machines look physically different. After the power leads and the jumper, equalizer and other leads, if used, are positioned concentrically around the end turns and the various connections brazed and taped, the bundle of lead conductors are all bound as tightly as possible to each other and to the series leads for precluding subsequent movement thereof when the machine is placed in operation.

One of the primary disadvantages of locating the lead and other conductors on the series connected leads is that they are subjected to magnetic and vibratory forces during machine operation which causes wear of insulation from adjacent conductors.

Another disadvantage resulting from not employing a uniform lead connecting procedure is that the possibility for error in making connections is increased, particularly in those machines where complex winding patterns are used. Moreover, the labor required to independently measure and cut each lead to length not only involves an added expense but the lead measuring and cutting must be done after the coils are in place. The assembly process therefore involves a series operation of construction rather than the preferred parallel one wherein the leads could be made simultaneously with the insertion of coils in the magnetic core.

In view of the above, it is evident that the need exists for an improved method of assembling and making the lead connections in a motor or generator which not only will be economical but also will assure the production of machines having no errors in the lead connection arrangements and wherein the likelihood of establishment of electrical faults can be held to a minimum.

The primary object of our invention therefore is to provide an improved method of connecting power and other leads to a winding in a dynamoelectric machine by utilizing a preformed connection harness having conductors therein isolated from each other and adapted for connection to leads extending outwardly from the winding.

Another object of our invention is to provide an improved connection harness incorporating leads extending between a power source and a machine winding and including interconnected conductors therein for achieving a desired mode of machine operation.

In carrying out our invention, we assemble coils in a magnetic core to form the winding for a dynamoelectric machine. In order to obtain a desired manner of machine performance, appropriate power lead, jumper, equalizer and other conductors of the correct length are positioned in a connection harness and connected to each other and to coils in the machine. The connection harness is made in a circular mold of U-shaped cross-section with appropriate lengths of the leads extending outwardly through openings provided in the mold. A thermosetting resinous composition having a filler therein is then poured into the mold and around the conductor leads so that an intimate bond is obtained with the outer layer of insulation on the conductors. Upon curing of the resin, the harness connection thus formed is removed from the mold and placed around the protruding coil end turns in the machine and secured either to the frame or to the coil end turns. The various leads thus are located in a predetermined position and thereby assures making the correct lead connections to the winding in the machine.

While the specification concludes with claims particularly pointing out and distinctly claiming the subject matter which we regard as our invention, it is believed the invention will be better understood from the following description taken in connection with the accompanying drawings in which:

Figure 1:
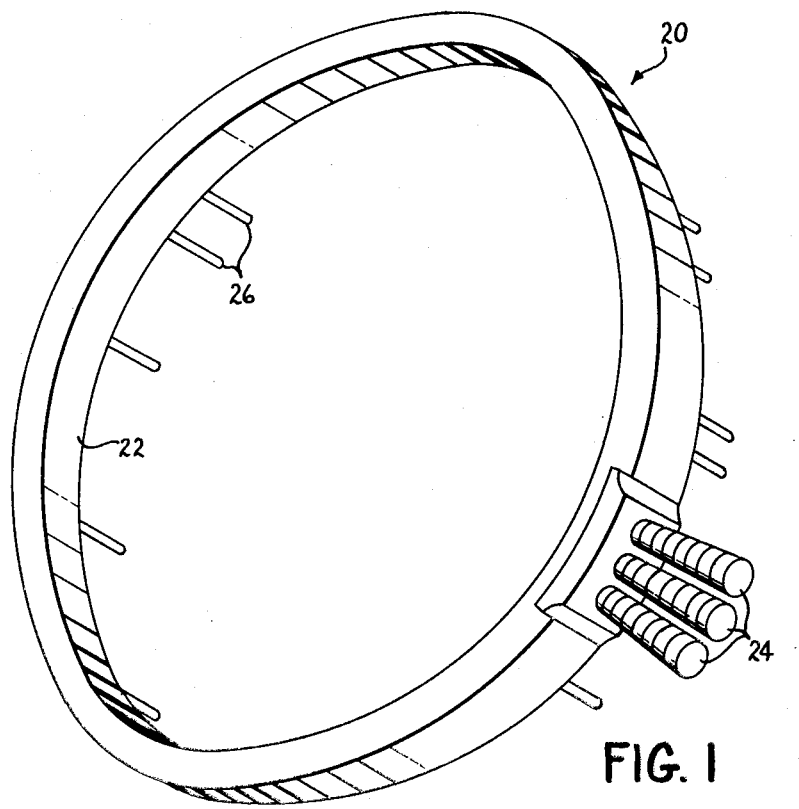
FIGURE 1 is a perspective view of the connection harness of this invention.
Figure 2:
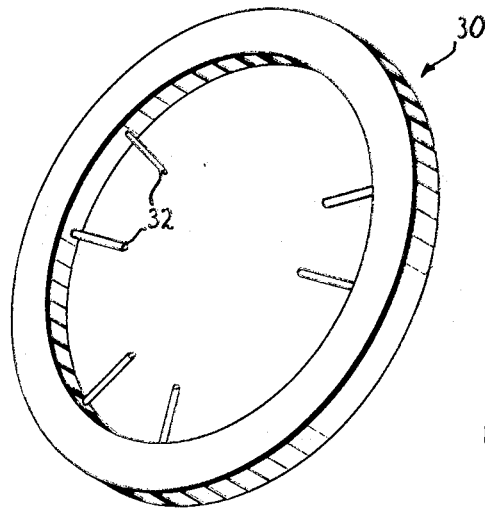
FIGURE 2 is a perspective view showing a similar harness used when equalizer connections are required.

Referring now to the drawings wherein like reference characters designate like or corresponding parts throughout the several views, there is shown a portion of a magnetic core 10 having a flange ring 12 on an outer end thereof held in place by a snap ring 14 in the usual manner. A multiplicity of form wound coils 16 placed around the core are equipped with leads 18 which when connected in any one of a number of different ways, form a Y, delta, independent or other kind of winding for the machine. Obviously, random wound windings may be used.

Instead of employing the prior art practices of having an operator cut insulated conductors to a predetermined length and making the various power, jumper, equalizer and other connection to coil leads in the machine, we utilize a device or connection harness capable of eliminating many of the disadvantages therein, as discussed above, while still obtaining performance of the same function. Such a connection harness is made in a mold, preferably of aluminum, coated or lined with any product non-adherent to thermosetting resinous compositions. In practicing the invention, the machine designer determines what kind of a winding will be necessary to obtain the needed performance from the machine when placed in service. A multitude of factors must be considered and a conclusion ultimately is reached as to what jumper, equalizer, Y ring and/or other auxiliary leads will be necessary to provide a winding capable of producing the flux patterns required to satisfy the anticipated loads. Having once determined what additional insulated conductor leads are necessary and how the coils are to be connected, the designer then establishes the size and length of leads to be cut for the particular machine.

An operator engaged in the manufacturing operation then cuts the appropriate conductor leads to the exact predetermined length at a workbench, bends and places them in the mold and in position such that the ends thereof will be available for connection at the correct point to the coil leads of the winding in the machine. Insulated or non-insulated conductor leads may be used. All those leads to be connected to one another can be made and taped at a workbench before being placed in the mold thus making the manufacturing operation more economical and efficient.

Another particular benefit is that better control over the position of the main power leads is obtainable. Knowing that full phase voltage exists between them, the operator can physically locate the leads in spaced relationship to each other and thus minimize the establishment of electrical faults when the machine is placed in operation.

After all of the leads have been assembled in the correct position in the mold, the mold is filled with an epoxy resin having a filler uniformly dispersed therein. Because of its relatively low viscosity, the resin flows freely between and around adjacent conductors while at an elevated temperature and upon curing forms a very firm bond with the insulation. Where the differential of expansion between the copper and resin is great, especially in high temperature environments, insulation is used on the conductor surface. Where the differentials and temperatures are low, insulation is not needed. Air evacuating means, not shown, are used for evacuating air from the mold including the resinous composition, and as a result, there are few, if any, air pockets in the body of epoxy resin and the encapsulated insulated leads. The mold is then placed in an oven and heated to a temperature to obtain curing of the resin which, as is well known, then establishes a product having substantially the strength of steel. Any one of a number of commercially available products can be sprayed or otherwise coated on the mold before introduction of the epoxy resin so that the resin does not adhere to the mold surfaces.

Figure 3:
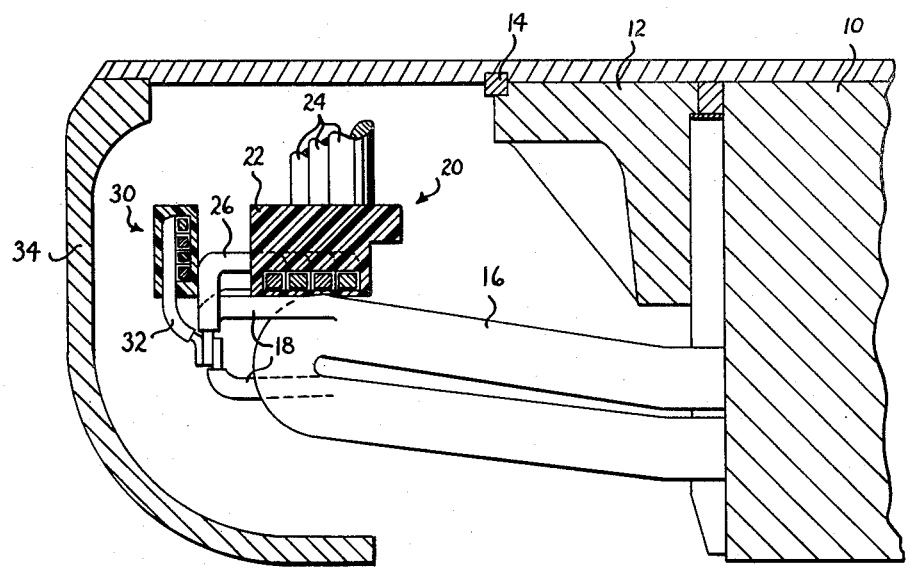
FIGURE 3 is a sectional view in elevation showing the disposition of the connection harness with respect to coil end turns.

Reference to the drawing will show that a different type of harness is used in making the various lead connections. FIGURE 1 illustrates a harness 20 consisting of a body of epoxy resin 22 encapsulating a plurality of insulated conductor leads 24 and jumper connections 26, shown in FIGURE 3. The harness is positioned concentrically around the outer diameter of the end turns and the jumper leads 26 extend axially outward from the harness to a position appropriate for connection to the leads 18 extending from the coils in the winding. Since the harness is made in a mold, it is evident that all the leads which must extend outwardly therefrom can exit from the harness at any point which is convenient for connection to the coil leads 18.

The harness 30 which contains the equalizer leads 32 and other jumper leads, not shown, illustrates the different kind of construction which may be used, particularly in the area of having the leads extend outwardly therefrom. The harness used for encapsulating the equalizer leads is made in the same manner as the connection harness for the other conductor leads which normally are placed around the end turns and tied thereto in the manner as previously described.

Because the harness connection is made to the same diameter as the distance across oppositely disposed end turns, it is placed in position over the end turns thus making the leads from the harness available for connection to the leads in the machine. These leads then are brazed and taped in the usual manner to provide an electrical connection assembly of high integrity. The harness preferably is secured at appropriate points to the frame of the machine or to the end turns by the use of glass roving impregnated with a thermosetting resinous composition. It will be evident that other types of securing means may be employed just as effectively since the problem merely is one of holding a large circular ring in an immovable position. It is evident that when the harness is placed on the end turns and tied thereto by the glass roving, wire or resin-treated glass tape previously used may be eliminated and its function of holding the end turns in an immovable position be performed by the harness. This harness is especially suited for performing this kind of end turn restraining function because of the strength and stability imparted thereto by both the copper of the embedded conductors and the epoxy resin which has been cured to a hard rigid substance.

In a practical embodiment the composition of the resinous material used consisted of 100 parts No. 2795 Bakelite epoxy resin manufactured by the Union Carbon and Carbide Company; 100 parts filler preferably comprising Surfex, a precipitate of calcium carbonate, and available from the Diamond Alkali Company; 50 parts of a combined plasticizer and catalyst preferably comprising Versamid 125 made by the General Mills Corporation; and a catalyst or hardener, preferably DMP 30 made by the Rohm and Haas Company.

In view of the relatively simple function performed by the epoxy resin and the filler, plasticizer and catalyst therein, it will be evident that many other different products may be used provided they remain stable within the operating temperatures of a dynamoelectric machine and display the other desirable properties of high dielectric and mechanical strength and is resistant to attack by foreign elements of the type found in the corrosive atmospheres of industrial mills, such as steel and rubber mills. Since the epoxy will provide a high gloss surface upon curing, it will be evident that foreign deposits such as carbon black will not readily form thereon, and as a result, current creepage paths will not be established in this area of the machine.

The primary advantages inherent in employing this kind of harness connection is that it will eliminate the abrasion which otherwise occurs between the concentric lead conductors and the coil leads over which they are placed. Because accurate control can be placed over the methods of making connections and therefore the physical arrangement thereof, it will be possible to advise customers of the location of any burned out coils in the electrical circuit of the machine, and thereby simplify for the customer, remedial measures to be taken. Also, the likelihood of grounds occurring between the conductor leads and the end turns is made remote because those conductors carrying full phase voltage can now be more accurately positioned with respect to one another to eliminate this possibility.

In view of the above, it will be evident that many modifications and variations are possible in the light of the above teachings. It therefore should be understood that within the scope of the appended claims the invention may be practiced otherwise than as specifically described.

What we claim as new and desire to secure by Letters Patent of the United States is:

1. In a magnetic core for a dynamoelectric machine including coils having coil end turns and leads extending outwardly therefrom, the improvement comprising a connection harness including a detachable ring concentrically positioned around said end turns and secured to a frame of the machine for minimizing abrasive wear of the leads and end turns during machine operation, said ring comprising a body of insulating material encapsulating a plurality of leads employed for providing power to said winding, said ring further including insulated conductors embedded therein and connected to the coil leads to provide a predetermined mode of operation of said machine.

2. In a magnetic core for a dynamoelectric machine having conductors in slots provided therein and equipped with end turns and leads extending outwardly therefrom, the improvement comprising a body of thermosetting resinous material positioned concentrically on the end turns and having a plurality of conductors embedded therein, said conductors comprising leads extending from a power source at one end and connected at their other ends to the leads extending outwardly from said coils, the conductors further including a multiplicity of jumpers and other conductors which when connected to the coil leads, provides a flux pattern in accordance with the manner in which the coils are connected.

3. In a magnetic core for a dynamoelectric machine having a winding including coils and end turns extending outwardly therefrom, the improvement comprising a connection harness disposed adjacent the peripheral surface of said end turns, said connection harness including a ring of resinous material cured to a hard mass and displaying a glassy-like surface resistant to the deposition of foreign particles, a multiplicity of conductor leads embedded in said resinous material and positioned in insulating relationship with each other, each of said conductor leads having their opposite ends projecting outwardly from said ring and at a point where connection conveniently can be made to leads extending outwardly from coils in the mangetic core, means securing the conductor leads to the coil leads and insulation on said leads at the point of connection, said multiplicity of conductor leads and connections further comprising power, jumper and equalizer leads connected to obtain establishment of a desired flux pattern in the magnetic core when the coils are energized.

4. The combination according to claim 3 wherein said ring is placed on the outer peripheral surface of the end turns and secured thereto for preventing end turn displacement when the coils are subjected to mechanical and vibratory forces.

5. The combination according to claim 4 wherein said ring is attached to a frame used for containing the magnetic core.

6. The combination according to claim 4 wherein the ring is attached to the coil end turns.

7. In a magnetic core for a dynamoelectric machine having a winding including coils and end turns extending outwardly therefrom, the improvement comprising a connection harness disposed adjacent the peripheral surface of said end turns, said connection harness including a ring of resinous material cured to a hard mass and displaying a glassy-like surface resistant to the deposition of foreign particles, a multiplicity of power, jumper, and connection leads of predetermined length located at preselected positions in said ring, said leads all being insulated from each other and having their ends projecting outwardly from the ring for connection to leads extending from the winding in the magnetic core, insulation on said leads at the point of connection, a second ring of resinous composition having equalizer leads embedded therein and positioned in insulating relationship with each other, said equalizer leads having ends projecting outwardly from the ring for connection to leads associated with the winding, and means securing said second ring in a fixed position with respect to said first ring.

References Cited in the file of this patent
UNITED STATES PATENTS

| | | |
|---|---|---|
| 2,583,804 | Andrus | Jan. 29, 1952 |
| 2,801,354 | Donahoo | July 30, 1957 |